(12) United States Patent
Chen et al.

(10) Patent No.: US 11,162,850 B2
(45) Date of Patent: Nov. 2, 2021

(54) SENSOR ASSEMBLIES WITH INTEGRATED ELECTRICAL CONNECTIONS AND DIAPHRAGM OVERLOAD PROTECTION

(71) Applicant: Measurement Specialties, Inc., Hampton, VA (US)

(72) Inventors: Ya-Mei Chen, Fremont, CA (US); James Hoffman, Santa Clara, CA (US)

(73) Assignee: MEASUREMENT SPECIALTIES, INC., Hampton, VA (US)

( * ) Notice: Subject to any disclaimer, the term of this patent is extended or adjusted under 35 U.S.C. 154(b) by 263 days.

(21) Appl. No.: 16/394,915

(22) Filed: Apr. 25, 2019

(65) Prior Publication Data

US 2020/0340868 A1    Oct. 29, 2020

(51) Int. Cl.

| G01L 1/18 | (2006.01) |
|---|---|
| G01L 1/22 | (2006.01) |
| G01L 1/26 | (2006.01) |
| G01L 9/00 | (2006.01) |

(52) U.S. Cl.
CPC .............. *G01L 1/18* (2013.01); *G01L 1/2237* (2013.01); *G01L 1/26* (2013.01); *G01L 9/0055* (2013.01)

(58) Field of Classification Search
None
See application file for complete search history.

(56) References Cited

U.S. PATENT DOCUMENTS

| 5,760,313 | A | 6/1998 | Guentner et al. |
|---|---|---|---|
| 9,869,598 | B1 | 1/2018 | Wade et al. |
| 9,986,074 | B2 | 5/2018 | Fan |
| 10,001,418 | B1 | 6/2018 | Machir et al. |
| 10,036,676 | B1 | 7/2018 | Bradley et al. |
| 2005/0217386 | A1 | 10/2005 | Hirose et al. |
| 2013/0247689 | A1 | 9/2013 | Thanigachalam et al. |
| 2014/0007705 | A1 | 1/2014 | Campbell et al. |
| 2017/0007705 | A1 | 1/2017 | Ng et al. |
| 2018/0180494 | A1 | 6/2018 | Speldrich et al. |

FOREIGN PATENT DOCUMENTS

| EP | 0312605 A1 | 4/1989 |
|---|---|---|
| EP | 3260831 A1 | 12/2017 |

OTHER PUBLICATIONS

Extended European Search Report, European Application No. 20170195.0-1001, European Filing Date, Sep. 18, 2020.

*Primary Examiner* — Brandi N Hopkins
*Assistant Examiner* — Nigel H Plumb (57) ABSTRACT

The sensor assembly comprises a sensor die comprising first and second members. The first member accommodates an actuation element on a second surface of the first member and in contact with a diaphragm that is integral with the first member. The second member is bonded to a first surface of the first member opposite the second surface, and sensing elements are positioned adjacent the diaphragm along the first surface and interposed between the first and second members. The second member also includes a recessed section that forms a cavity adjacent the diaphragm to accommodate and/or limit diaphragm deflection. An internal electrical connection is made between first and second member electrical contacts disposed along the interface between the first and second members to avoid external wires. The second member further includes external electrical terminals to facilitate an electrical surface connection with the sensor assembly without the need for external wires.

20 Claims, 6 Drawing Sheets

Deflection with Applied Force

SENSOR ASSEMBLIES WITH INTEGRATED ELECTRICAL CONNECTIONS AND DIAPHRAGM OVERLOAD PROTECTION

FIELD

Sensor assemblies as disclosed herein relate to sensors comprising a sensor membrane or diaphragm that deflects in response to an applied force and which deflection is measured for purposes of determining the amount of force and, more specifically, sensor assemblies that are specially configured to provide a desired sensitivity of force measurement with a reduced degree of diaphragm deflection.

BACKGROUND

The use of sensor assemblies for purposes of determining an amount of force that is imposed upon a sensor element, diaphragm or membrane is known in the art. For purposes of determining an amount of a force imposed by a physical element, force sensors are used. Conventional force sensors comprise a force sensor die that includes a diagram and electrical sensing elements connected therewith, and an actuation element that is made separately from the sensor die and that is combined with the sensor die such that the actuation element contacts a section of the diaphragm. The actuation element extends from the force sensor to receive an external force that is then transmitted by the actuation element onto the diaphragm of the sensor die, causing the diaphragm to deflect, which deflection is measured by the electrical sensing elements.

While such conventional force sensors are useful for determining the amount of force imposed therein, the construction of such force sensors comprising the sensor die and actuation element that are manufactured separately and then assembled together at a later step requires that package tolerance must be well controlled, and further size reduction of such construction is limited. Further, arrangement of the separate actuation element placed on top of sensor die diaphragm and the repeated contact made therebetween during repeated operation of the force sensor may lead to sensor diaphragm contact fatigue issues that may shorten the effective service life of such force sensors. Further, the sensing element of such known force sensors may be exposed to the external environment, which may influence the performance of the force sensor. Still further, such known force sensors may not include a feature limiting the deflection of the diaphragm, which may cause the diaphragm to be torn or otherwise damaged if exposed to a overload external force during operation.

It is, therefore, desired that sensor assemblies be constructed in a manner that enable manufacturing and assembly of the different members and elements to take place together. It is desired that such sensor assemblies be constructed in a manner that reduces or eliminates the possibility of sensor die surface fatigue from repeated contact from the actuation element. It is further desired that such sensor assemblies be constructed in a manner that protects the electrical sensing elements from the external environment. It is still further desired that sensor assemblies be constructed in a manner limiting total diaphragm deformation so as to reduce or eliminate unwanted diaphragm damage from force overload.

SUMMARY

Sensor assemblies as disclosed herein comprise a sensor die that may include a first member and a second member. The first member comprises a diaphragm extending between a first surface of the first member and an opposed second surface of the first member. A number of electrical sensing elements are disposed within the first member and positioned adjacent the diaphragm along the first surface. The second member is attached with the first member along the first surface, the second member comprising a recessed section that forms a cavity with the first member first surface. In an example, the recessed section is positioned directly opposite the diaphragm. In an example, the recessed section is sized to limit a total deflection amount of the diaphragm. The sensor die first and second members may each be formed from silicon and are bonded together. The first member includes an actuation element attached thereto and that extends outwardly from the first member second surface. In an example, the actuation element is positioned directly on the diaphragm. In an example, the actuation element and the diaphragm are each integral with the first member. The sensor assembly may include one or more metallic contacts connected with a surface of the second member opposite the first member, wherein the one or more metallic contacts are in electrical connection with the electrical sensing elements in the first member, and wherein the metallic contacts facilitate a surface mount electrical connection of the sensor assembly. In an example, the sensor assembly may be a force sensor.

A method for sensing a force using sensor assemblies as disclosed herein comprises subjecting a force from an external object onto the actuation element causing the force to be transmitted through the first member to the diaphragm causing the diaphragm to deflect. The amount of force imposed onto the actuation element may be determined from the amount of diaphragm deflection as measured by the electrical sensing elements enclosed with sensor die. The electrical sensing elements provide an output signal that is transferred from the sensor die through the electrical contacts and to a surface of the sensor die. Wherein the force may be determined from the output signal through the use of an external device electrically connected to receive such output signal.

BRIEF DESCRIPTION OF THE DRAWINGS

Sensor assemblies as disclosed herein will now be described by way of example with reference to the accompanying Figures, of which.

DETAILED DESCRIPTION

Embodiments of sensor assemblies will be described hereinafter in detail with reference to the attached drawings, wherein like reference numerals refer to the like elements. Sensor assemblies as disclosed herein may, however, be embodied in many different forms and for different types of uses and should not be construed as being limited to the embodiments set forth herein; rather, these embodiments are provided so that the disclosure will be thorough and complete, and will fully convey the concept of sensor assemblies to those skilled in the art. Sensor assemblies as disclosed herein may be used in applications where a force imposed thereon by a physical object is being measured, wherein such sensor assemblies may be referred to as force sensors. However, it is to be understood that the sensor assemblies as disclosed herein may be used for other types of force registering/monitoring applications other than ones where a force from a physical object is being imposed thereon for measurement, such as pressure sensor applications where a fluid pressure or the like is being monitored.

Figure 1A:
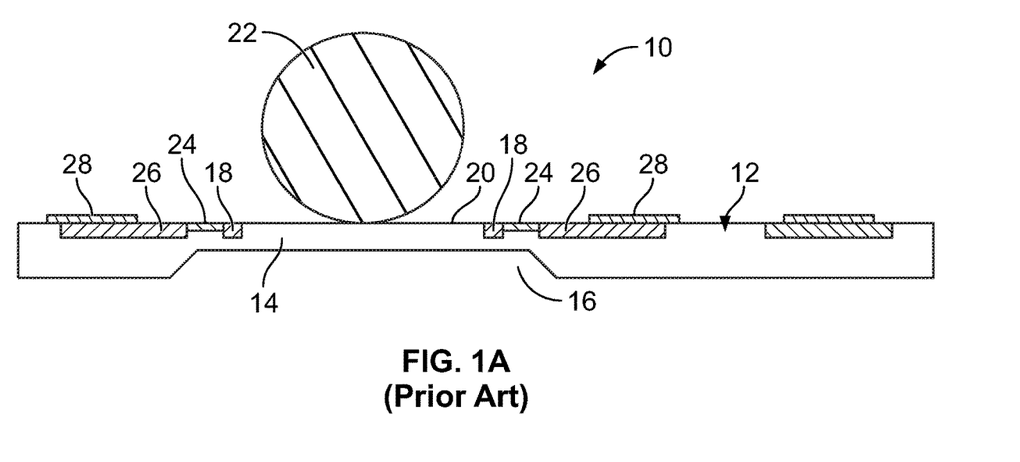
FIG. 1A is a cross-sectional side view of a prior art sensor assembly in a first state.

FIG. 1A illustrates a conventional force sensor 10 comprising a sensor die 12 that includes a diaphragm 14 having a thickness defined from a recessed section 16 beneath the diaphragm. The sensor die 12 also include electrical sensor elements 24 that are positioned adjacent the diaphragm 14, e.g., in the form of piezoresistive elements or the like that may be arranged in a Wheatstone bridge for purposes of providing a desired electrical signal for detecting movement along a surface 20 of the diaphragm in response to a force imposed thereon. An actuation element 22 is provided separately from the sensor die and is disposed on the diaphragm surface 20. In this prior art force sensor, the actuation element is provided in the form of a solid spherical element capable of transmitting a physical force imposed thereon to the diaphragm. The sensor die 12 also includes electrical connectors and or contacts 18 and 26 disposed along a surface of the die, wherein, wherein electrical terminals 28 extend outwardly from the contacts for connecting with an external object. In such prior art force sensor, the electrical sensing elements 24, electrical connectors and/or contacts 18 and 26 are all exposed to the external environment along a surface of the sensor die. FIG. 1A shows the prior art force sensor in a nonactive state, where there is no external physical force applied to the actuation element 22.

Figure 1B:
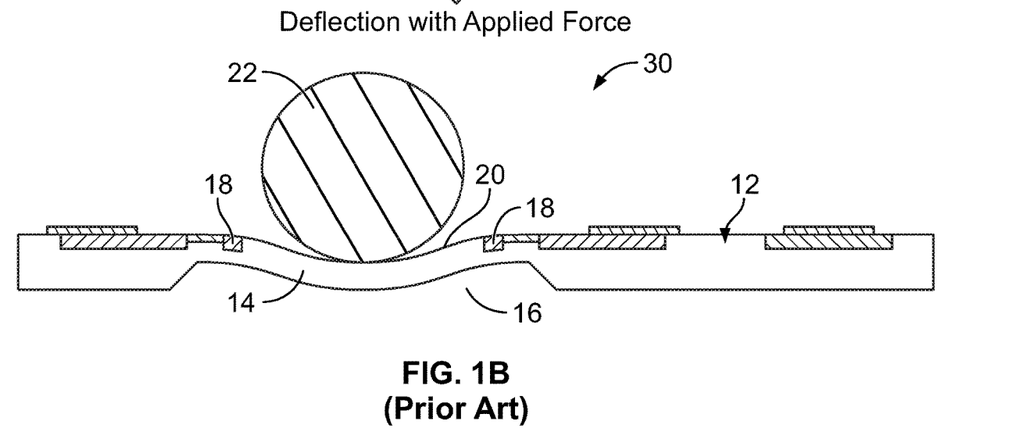
FIG. 1B is a cross-sectional side view of the prior art sensor assembly of FIG. 1A in a second state.

FIG. 1B shows the prior art force sensor 30 described above, comprising the sensor die 12, actuation element 22 disposed on the surface 20 of the diaphragm 14, shown in an active state were an active external force is physically imposed onto the actuation element 22. As illustrated, in the activated state, the actuation element 22 transmits the external force onto the sensor diagram 14 causing it to deflect downwardly into the recessed section 16. The amount that the diagram deflects depends on the amount of force imposed thereon, and there is no feature or element present in such prior art force sensor construction that operates to physically stop or limit the amount of deflection. In this active state, the electrical sensing elements 24 measure change along the diaphragm surface 14 and provide an output signal for determining the force imposed thereon therefrom.

As discussed above, such prior art force sensors may experience reduced surface life or performance issues due to such factors as diaphragm surface fatigue from repeated contact between the diaphragm surface and actuation element during use, exposure of the electrical sensing elements and related electrical connectors and contacts to the external environment, and diaphragm damage that may occur from unstopped deflection in response to an overload force.

Figure 2A:
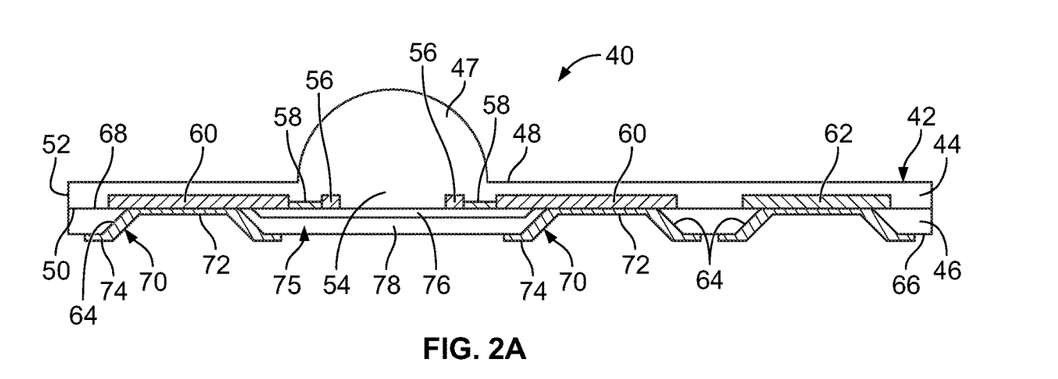
FIG. 2A is cross-sectional side view of an example sensor assembly as disclosed herein in a first state.

FIG. 2A illustrates an example sensor assembly 40 as disclosed herein shown in a nonactive state where there is no external force applied thereto. The sensor assembly generally comprises a sensor die 42 that is formed from two members 44 and 46. In an example, the two members are formed from silicon that are bonded together as will be better described below. The sensor die first member 44 is specially engineered comprising an actuation element 47 projecting outwardly from an outer surface 48 a desired distance. In an example, the actuation element is solid and may be provided in the shape of a hemisphere. It is to be understood that the actuation element may be shaped differently depending on the particular end-use application, and that such different shapes are understood to be within the scope of this description. The actuation element may be formed as a separate part that is bonded to the surface of the first member 44, or the actuation element may be integral with the first member. In an example, the actuation element is integral with the first member and formed during the process of forming the first member.

The sensor die first member 44 has a thickness extending between the outer surface 48 to an underside surface 50, and as best shown looking along an edge 52 of the first member. The first member 44 comprises a diaphragm 54 that is integral with the first member and that has a thickness defined by the thickness of the first member. The actuation element 47 is positioned above the diaphragm 54. In an example, the diaphragm thickness may be greater than about 5 micrometers, from about 5 to 500 micrometers, from about 10 to 100 micrometers, and in an example is from about 25 to 35 micrometers. It is to be understood that the exact thickness of the diaphragm may vary depending on the particular end-use application. In an example, the actuation element may extend from the first member outer surface 48 greater than about 300 micrometers in radius, and from about 25 to 920 micrometers. It is to be understood that the approximate distance that the actuation element extends may vary depending on such factors as the shape of the actuation element as well as the particular end-use application.

Referring still to the first member 44, electrical sensing elements 58 are positioned adjacent a peripheral edge of the diaphragm 54 along the underside surface 50 of the first member. The electrical sensing elements may be in the form or piezoresistive elements or the like that are arranged in a Wheatstone bridge to detect changes along the diaphragm surface in response to a force being imposed thereon and providing an electrical signal output for determine the amount of such force. Electrical connectors and/or contacts 56 and 60 extend from the electrical sensing elements 58 and are positioned adjacent the underside surface 50. The first member 44 may include one or more other electrical connectors and/or contacts 62 positioned adjacent the underside surface 50 as called for, e.g., for the purpose of applying a voltage bias to the silicone substrate, or for other sensor operating purposes. In an example, the electrical sensing element is placed underneath the edge of the actuation element where the maximum stress will be experienced.

The sensor die second member 46 comprises a number of openings 64 formed therein that extend through a thickness the second member as defined between an outer surface 66 and an underside surface 68 as better described below. Electrical terminals 70 are disposed within the openings and are configured having a contact sections 72 that are in electrical communication with respective first member electrical contact 60, and further comprise external pads 74 for making electrical contact with an external object. Thus, a feature of the sensor assembly 40 as disclosed herein is the ability to form an electrical contact with an external device along an underside surface of the second member 46, i.e., along a surface of the sensor die opposite that from which the actuation element extends. The second member 46 includes a recessed section 75 formed during an etching process or the like as better described below. The recessed section 75 is positioned directly adjacent the diaphragm 54 and provides a buried cavity 76 within the sensor die for the diaphragm to deform therein in response to an external force. The cavity may or may not be vented to an external environment. In an example, the cavity is vented. The depth of the recessed section, as measured from the second member underside surface 68 to a closed section 78 of the cavity may be greater than about 5 micrometers, and from about 1 to 50 micrometers. It is to be understood that the approximate depth of the recessed section may vary depending on such factors as the thickness of the diaphragm as well as the particular end-use application. A feature of the sensor assembly as disclosed herein is the placement position of the cavity closed section 78 directly opposite the diaphragm 54 and its ability to mechanically or physically stop the diaphragm from being deformed beyond contact therewith. Accordingly, the thickness of the recessed section reflects a desired deformation limit for the diaphragm.

Figure 2B:
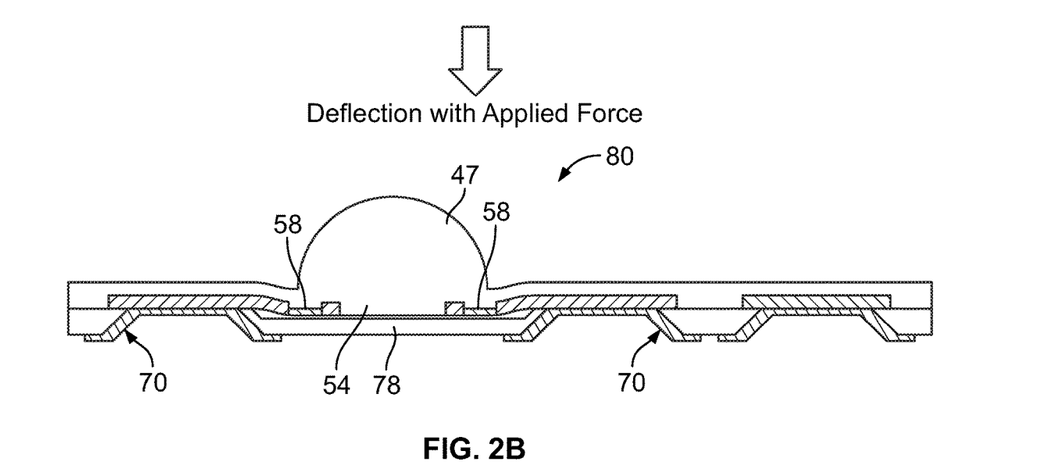
FIG. 2B is a cross-sectional side view of the example sensor assembly of FIG. 2A in a second state.

FIG. 2B illustrates the example sensor assembly 80 as described above now in an active state where an external force is imposed thereon. Thus, an external force is physically imposed on the actuation element 47 causing the actuation element and the integral diaphragm 54 to be moved downwardly (in FIG. 2B) and into the cavity. In this example, the diaphragm 54 is shown in a state of total deflection that is limited by contact with the cavity closed section 78 for purposes of illustrating such diaphragm deflection limit feature. However, it is to be understood that during normal activation of the sensor assembly, when subjected to applied forces within desired operating parameters, that the diaphragm will be deflected partially into the cavity. When in an active state, the electrical sensing elements 58 provide an output signal that is sent to through the electrical terminals 70 for determining such force, e.g., from an external device that is electrically connected with the sensor assembly via the electrical terminals.

Figure 3A:
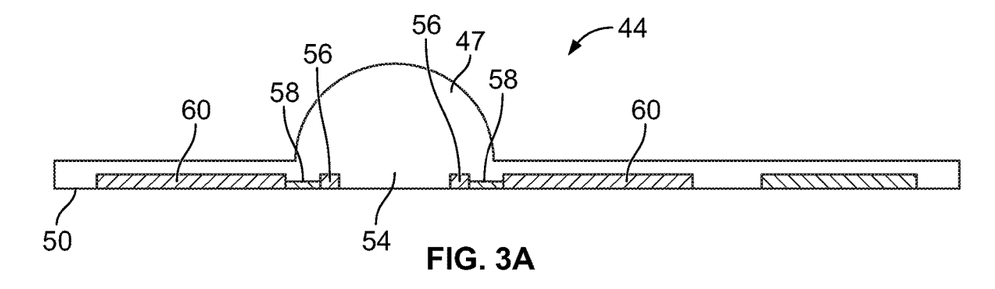
FIG. 3A is a cross-sectional side view of a first member of an example sensor assembly as disclosed herein.
Figure 3B:
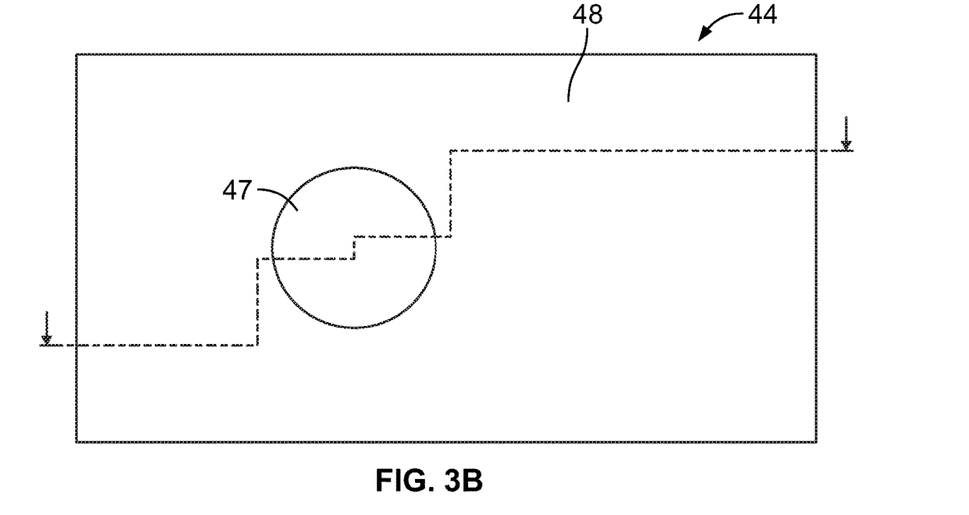
FIG. 3B is a top view of the example sensor assembly first member of FIG. 3A.
Figure 3C:
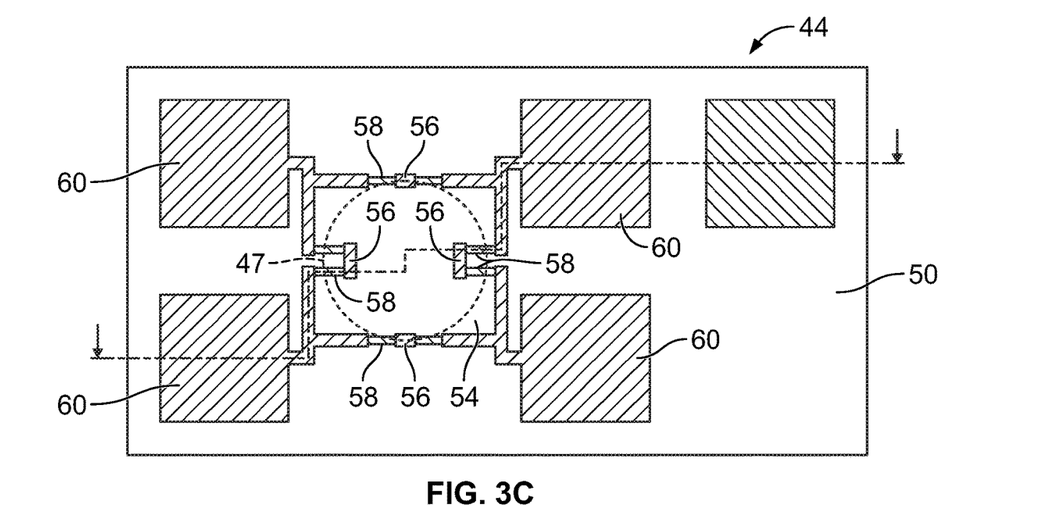
FIG. 3C is a bottom view of the example sensor assembly first member of FIG. 3A.

FIGS. 3A to 3B show different views of the sensor assembly sensor die first member 44 as disclosed herein. FIG. 3A illustrates the sensor die first member 44 comprising the actuation element 47, the diaphragm 54, the electrical sensing elements 58, electrical connectors and/or contacts 56 and contacts 60. The desired sensing element, electrical connectors, and electrical contacts are generated with dopant diffusion/implantation that is a well-known method for forming resistors and the like in silicon. In an example, the filling or assembly process takes place with the underside surface facing up, and when it is completed the first member 44 is flipped over for attachment with the second member 46. FIG. 3B shows a top view of the first member 44 illustrating the outer surface 48 and the placement position of the actuation element 47. FIG. 3C is a bottom view of the first member 44 illustrating the underside surface 50 as well as the placement positions of the electrical sensing elements 58 adjacent a peripheral edge of the diaphragm 54 and relative to the location of the actuation element 47. In this example, there are four electrical sensing elements 58 arranged at diametrically opposed positions around the diaphragm, and in an example underneath the edge of the actuation element and forming a Wheatstone bridge. Electrical connectors and/or contacts 58 and 60 extend from respective one or more of the electrical sensing elements. In this example, the sensor die first member 44 comprises five electrical contacts 60, wherein four of which are connected to the electrical sensing elements. The example sensor die first member is provided for purposes of reference, and it is to be understood that the different assembly components of the first member may be sized, shaped, numbered, and located differently than specifically described and illustrated, and that all such variations are understood to be within the scope of sensor assemblies as disclosed herein.

Figure 4A:
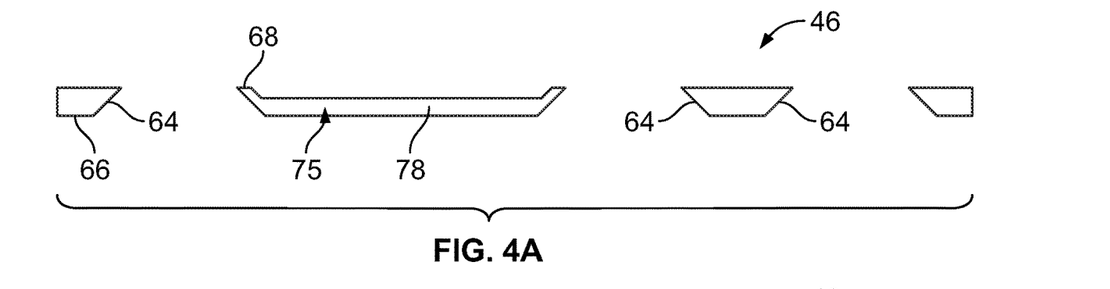
FIG. 4A is a cross-sectional side view of a second member of an example sensor assembly as disclosed herein.
Figure 4B:
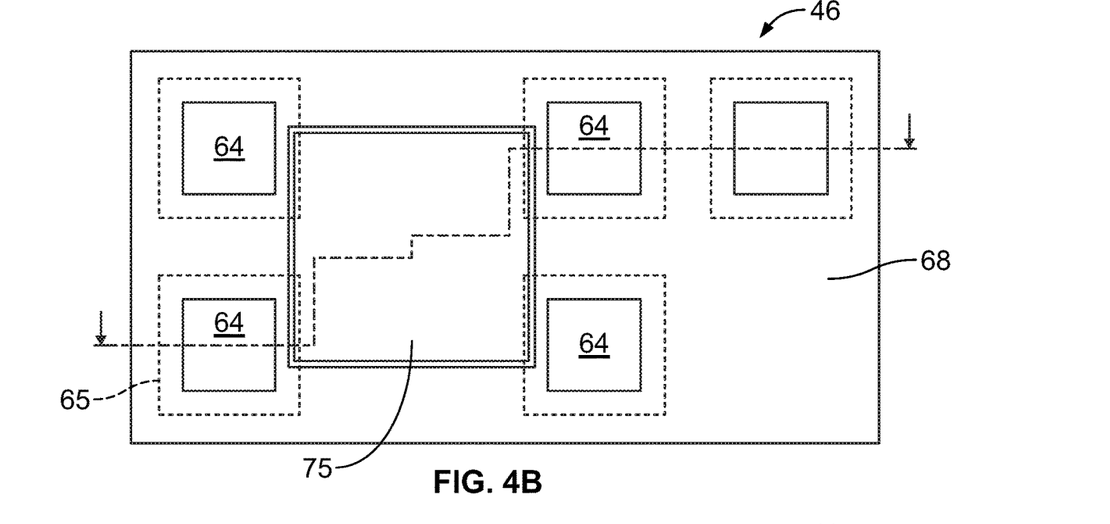
FIG. 4B is a top view of the example sensor assembly second member of FIG. 4A.
Figure 4C:
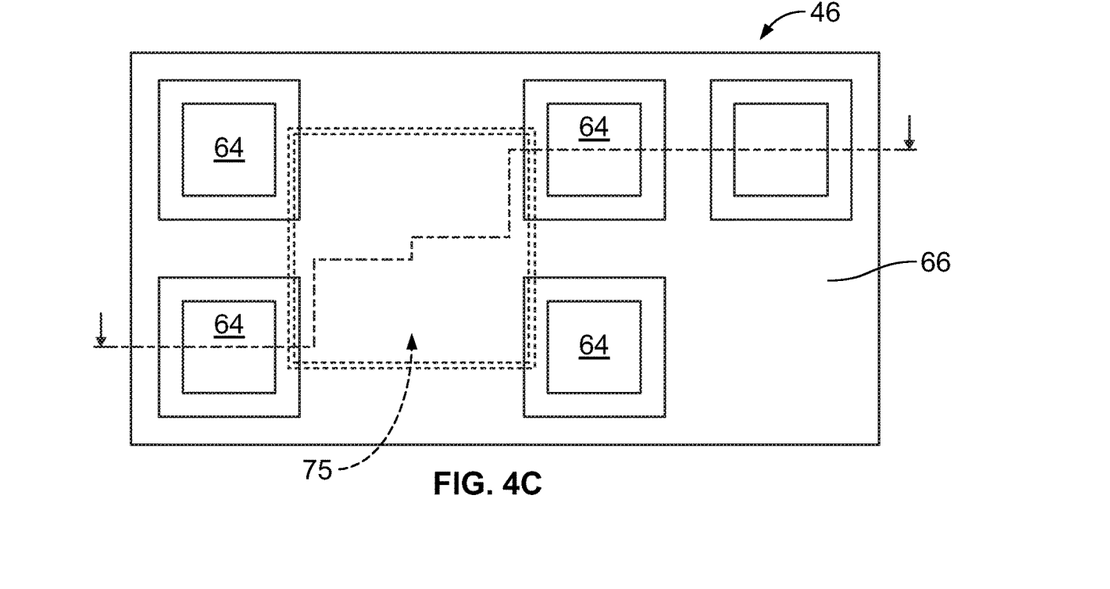
FIG. 4C is a bottom view of the example sensor assembly second member of FIG. 4A.

FIGS. 4A to 4C show different views of the sensor assembly sensor die second member 46 as disclosed herein. FIG. 4A illustrates the sensor die second member 46 comprising openings 64, the recessed section 75 with the closed section 78. In an example, the second member is formed from silicon and the recessed section is made by etching or the like a desired depth, configuration and location along the underside surface 68. In an example, the electrical terminals (not shown) are added to the second member, e.g., are positioned along the openings 64 after it has been attached to the first member. In the case of the openings 64, the second member is etched from the outer surface 66 therethrough and the placement position of the openings correspond to the electrical contacts in the sensor die first member. As noted above, the second member is etched to form the recessed section 75 at a position directly opposite the sensor die first member diaphragm. FIG. 4B shows a top view of the second member 46 illustrating the underside surface 68, the placement position of the openings 64 and the placement position of the recessed section 75. As illustrated in FIG. 4A, the openings 64 are configured having an inwardly-tapered shape moving inwardly from the outer surface 66, and the outermost edges 65 of the openings are shown in FIG. 4B. FIG. 4C is a bottom view of the second member 46 illustrating the outer surface 66 as well as the placement positions of the openings 64 and the recessed section 75. The example sensor die second member is provided for purposes of reference, and it is to be understood that the different components of the first member may be sized, shaped, numbered, and located differently than specifically described and illustrated, and that all such variations are understood to be within the scope of sensor assemblies as disclosed herein.

Figure 5:
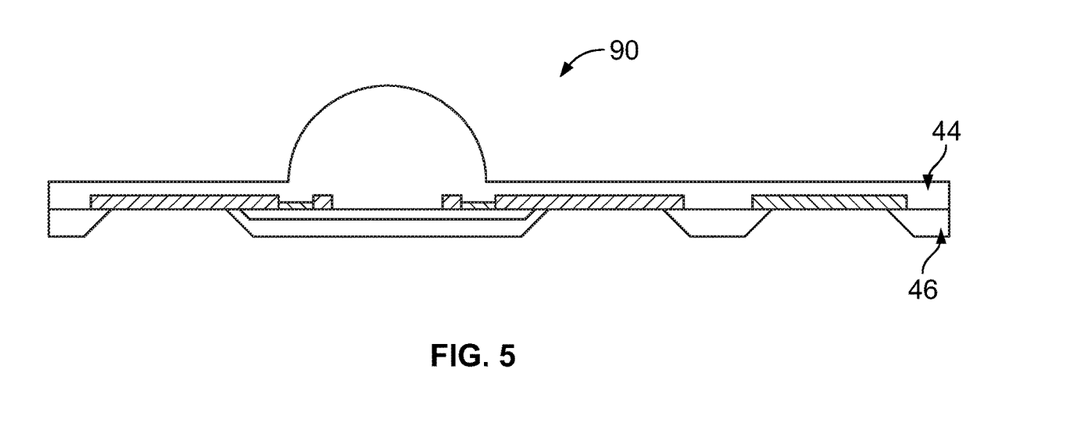
FIG. 5 is a cross-sectional side view of an example assembly as disclosed herein with the first and second members attached together.

FIG. 5 illustrates the sensor die 90 after the first member 44 and second member 46 have been attached to one another. Attachment between the two silicon members may be made by conventional bonding or adhesive process. In an example, as noted above, the electrical terminals are not provided in the second member 46 prior to attachment with the first member 44.

Figure 6A:
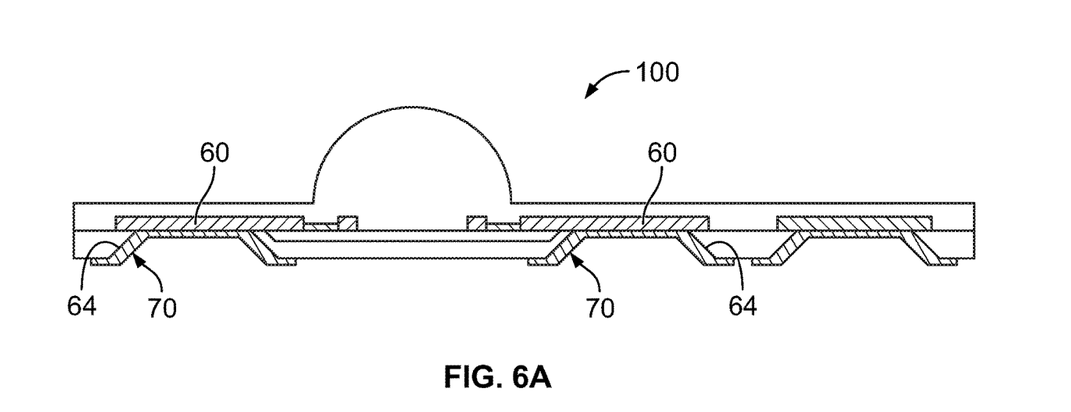
FIG. 6A is a cross-sectional side view of the example assembly of FIG. 5 in a completed state.
Figure 6B:
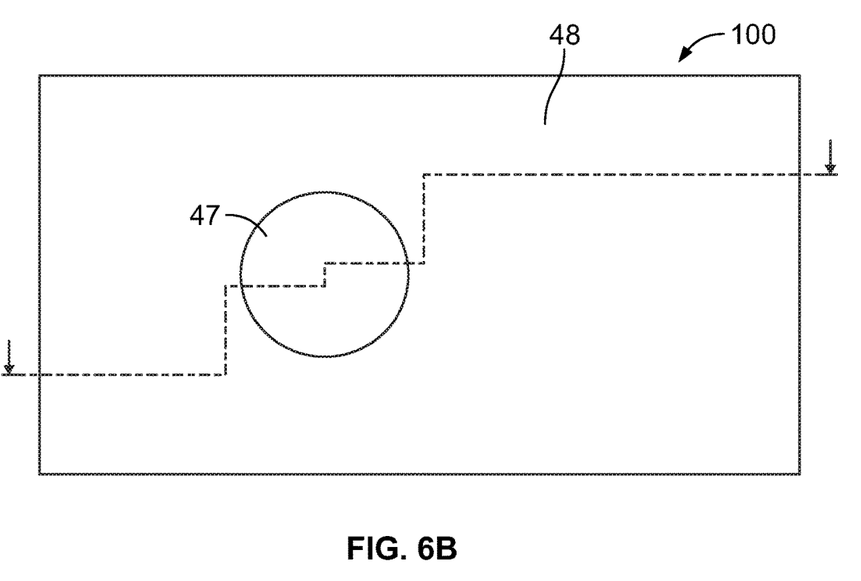
FIG. 6B is a top view of the example sensor assembly of FIG. 6A.
Figure 6C:
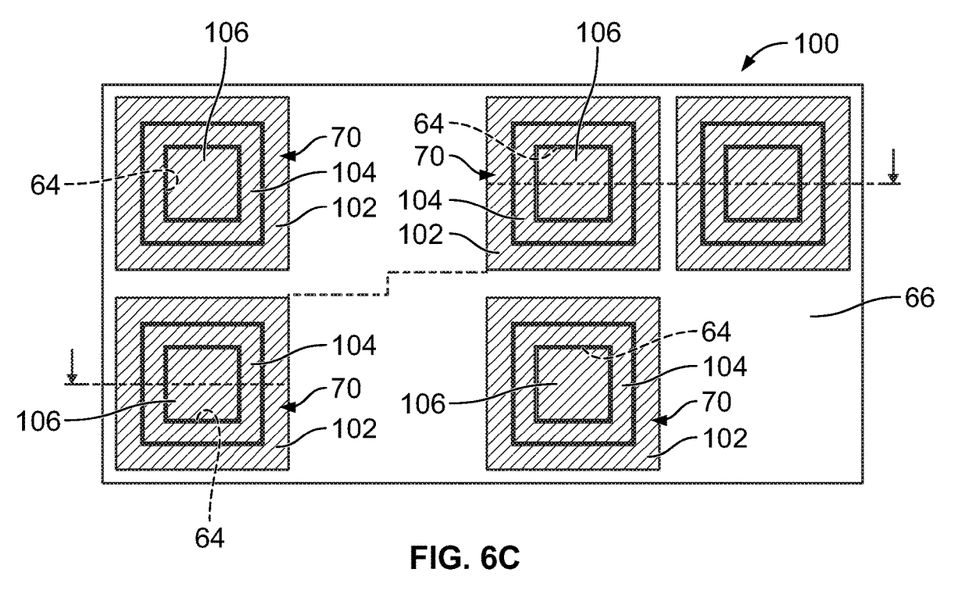
FIG. 6C is a bottom view of the example sensor assembly of FIG. 6B.

FIG. 6A illustrates an example sensor assembly 100 as disclosed a completed state, wherein the electrical terminals 70 are formed in the second member openings 64, and that are in contact with respective first member electrical contacts 60. In an example, the electrical terminals are formed after the first and second members are joined together to ensure a secure attachment between the respective electrical terminals and electrical contacts. It is to be understood within the scope of this disclosure that the electrical terminals may be formed in the second member prior to attachment with the first member. FIG. 6B illustrates a top view of the sensor assembly 100 showing illustrating the first member outer surface 48 and the placement position of the actuation element 47. FIG. 6C is a bottom view of the sensor assembly 100 illustrating the second member outer surface 66 as well as the placement positions of the electrical terminals 70 that now fill the openings 64. As illustrated in FIG. 6C, each of the electrical terminals comprise a first outer segment 102 that is planar with the outer surface, a second segment 104 extending inwardly from and concentrically within the first segment, wherein the second segment is angled upwardly into the second member. The electrical terminals 70 further comprise a third segment 106 that extends inwardly from and concentrically within the second segment, wherein the third segment is planer with the second member underside surface.

Features of sensor assemblies as disclosed herein include a construction that facilitates assembly of the features and elements together on a wafer scale, thereby avoiding the issues relating to controlling package tolerances and limitations on possible size reductions associated with prior art sensor assemblies. Also, such sensor assemblies as disclosed herein comprising an actuation element that is part of the sensor die reduces/eliminates repeatable contact between the actuation element and sensor surface present in the prior art sensor assemblies that could cause sensor surface fatigue and failure. Further, sensor assemblies as disclosed herein comprising electrical components interposed within the sensor die, e.g., disposed between the two sensor die members, avoids performance issues associated with prior art sensor assembly that have electrical components exposed to the external environment. Further, sensor assemblies as disclosed herein comprising the buried cavity provide a mechanical limit that controls total diaphragm deflection, thereby reducing/eliminating the prospect of diaphragm tearing or rupture in the event of being exposed to an overload force. Still further, sensor assemblies as disclosed herein comprise electrical terminals the enable electrical connection with an external device or component through the use of surface mount pads along one surface of the sensor assembly, thereby avoiding the need for wire bonding.

Another advantage of sensor assemblies as disclosed herein, comprising the elements and features noted above such as the use of an integral actuation element and diaphragm, is that in testing that have been shown to provide a desired degree of force detection/sensitivity (that is at least is equivalent to prior art sensor assemblies) with less significantly less diaphragm deflection, thereby operating in a manner that is less harmful to the diaphragm to thereby provide an improved service life.

While certain types and constructions of sensor assemblies have been disclosed and illustrated, it is to be understood that such examples have been provided for purposes of reference and illustration, and that sensor assemblies as disclosed herein should not be limited to the particular embodiments discussed above. Thus, sensor assembly embodiments other than those discussed and illustrated, while made and comprising the above-noted features as disclosed herein are understood to be within the scope of this description. For example, it is understood that all types of MEMS sensor assemblies comprising diaphragms or membranes exposed to external forces being measured comprising such sensor assembly elements and features and features are intended to be within the scope of sensor assemblies as disclosed herein and as defined by the following claims.

What is claimed is:

1. A sensor assembly comprising:
   a sensor die comprising:
      a first member comprising a diaphragm extending between a first surface of the first member and an opposed second surface of the first member, wherein a number of electrical sensing elements are disposed within the first member and positioned adjacent the diaphragm along the first surface;
      a second member attached with the first member along the first surface, the second member comprising a recessed section that forms a cavity with the first member first surface;
      wherein the first member includes an actuation element attached thereto and extending outwardly from the first member second surface.

2. The sensor assembly as recited in claim 1, wherein the actuation element is positioned directly on the diaphragm.

3. The sensor assembly as recited in claim 2, wherein the recessed section is positioned directly opposite the diaphragm.

4. The sensor assembly as recited in claim 1, wherein the actuation element and the diaphragm are each integral with the first member.

5. The sensor assembly as recited in claim 1 further comprising one or more metallic contacts connected with a surface of the second member opposite the first member, wherein the one or more metallic contacts are in electrical connection with the electrical sensing elements in the first member, and wherein the metallic contacts facilitate a surface mount electrical connection of the sensor assembly.

6. The sensor assembly as recited in claim 1, wherein the sensor die first and second members are each formed from silicon and are bonded together.

7. The sensor as recited in claim 6 wherein, the actuation element is formed from silicon.

8. The sensor as recited in claim 1, wherein the recessed section is sized to limit a total deflection amount of the diaphragm.

9. The sensor as recited in claim 1, wherein the diaphragm has a thickness of greater than 10 micrometers.

10. A force sensor assembly comprising a sensor die comprising a first member bonded together with a second member, wherein the first member comprises a diaphragm extending between a thickness of the first member, wherein the first member comprises electrical sensing elements disposed therein and positioned adjacent a first surface of the first member, wherein the electrical sensing elements are positioned adjacent the diaphragm, wherein the first member comprises an actuation element extending from a second surface of the first member that is opposite the first surface, wherein the actuation element is positioned on the diaphragm, and wherein the second member is bonded to the first member first surface and comprises a recessed section that is positioned along the first surface and opposite from the diaphragm to form a cavity between the second member and the diaphragm.

11. The force sensor as recited in claim 10, wherein the first member first surface includes one or more electrical contacts in communication with the electrical sensing elements, and wherein the one or more electrical contacts are exposed along the first surface.

12. The force sensor as recited in claim 11 further comprising one or more metallic contacts connected along a surface of the second member opposite the first member and extending to connect with the one or more electrical contacts, wherein the metallic contacts facilitate surface electrical attachment of the force sensor.

13. The force sensor as recited in claim 10, wherein the actuation element is an integral part of the first member.

14. The force sensor as recited in claim 10, wherein the recessed section is sized to limit a total amount of diaphragm deflection.

15. The force sensor as recited in claim 10, wherein the electrical sensing elements are enclosed within the sensor die between the first and second members.

16. The force sensor as recited in claim 10, wherein the sensor die first and second members are made from silicon.

17. A method for sensing a force comprising:
  subjecting a force from an external object onto an actuation element that is part of a sensor die first member, the actuation element extending outwardly from a second surface of the first member, wherein the actuation element is positioned on a diaphragm of the first member so the force is transferred from the actuation element to the diaphragm causing the diaphragm to deflect;
  detecting an amount diaphragm deflection from electrical sensing elements enclosed with sensor die and disposed along a first surface of the first member that is opposite the second surface, wherein the electrical sensing elements are connected to electrical contacts disposed in the first member and disposed along the first member first surface, wherein the electrical contacts are connected with metallic connectors attached with a second member of the sensor die, and wherein the second member is connected with the first member along the first surface; and
  determining the force from the output of the electrical sensing elements as transmitted from the sensor die first member through the metallic connectors.

18. The method as recited in claim 17, wherein the actuation element is an integral part of the sensor die first member.

19. The method as recited in claim 17 further comprising the step of limiting a maximum deflection of the diaphragm by the presence of a recessed section of the second member that is positioned directly opposite the diaphragm and that forms a cavity sized to contact the diaphragm at maximum deflection.

20. The method as recited in claim 17, wherein the metallic connectors are disposed along one surface of the sensor die second member to facilitate a surface electronic connection of the sensor die.

* * * * *